US012771022B2

(12) United States Patent
Shen et al.

(10) Patent No.: US 12,771,022 B2
(45) Date of Patent: Oct. 20, 2026

(54) FLEXIBLE SCREEN TERMINAL, ANTENNA ADJUSTING METHOD, AND STORAGE MEDIUM

(71) Applicant: ZTE CORPORATION, Shenzhen (CN)

(72) Inventors: Shaowu Shen, Shenzhen (CN); Ronglin Shao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 393 days.

(21) Appl. No.: 18/559,367

(22) PCT Filed: May 5, 2022

(86) PCT No.: PCT/CN2022/091010
§ 371 (c)(1),
(2) Date: Nov. 7, 2023

(87) PCT Pub. No.: WO2022/237622
PCT Pub. Date: Nov. 17, 2022

(65) Prior Publication Data

US 2024/0243468 A1 Jul. 18, 2024

(30) Foreign Application Priority Data

May 13, 2021 (CN) ......................... 202110524383.2

(51) Int. Cl.
*H01Q 3/00* (2006.01)
*H01Q 1/08* (2006.01)
*H01Q 3/24* (2006.01)

(52) U.S. Cl.
CPC ............... *H01Q 3/24* (2013.01); *H01Q 1/085* (2013.01)

(58) Field of Classification Search
CPC .......... H01Q 3/24; H01Q 1/085; H01Q 1/243; H01Q 1/521; H01Q 21/28; H01Q 1/002;
(Continued)

(56) References Cited

U.S. PATENT DOCUMENTS 8,698,676 B2 * 4/2014 Ikuta ........................ H01Q 7/00 343/702
8,989,792 B1 * 3/2015 Depew ................. H04B 1/3838 455/575.4
(Continued)

FOREIGN PATENT DOCUMENTS

CN 107911126 A 4/2018
CN 108810261 A 11/2018
(Continued)

OTHER PUBLICATIONS

WIPO, International Search Report issued on Jul. 13, 2022.
(Continued)

*Primary Examiner* — Ping Y Hsieh
(74) *Attorney, Agent, or Firm* — Li & Cai Intellectual Property (USA) Office

(57) ABSTRACT

There is provided a flexible screen terminal, an antenna adjusting method and a storage medium. The flexible screen terminal includes a first detection module configured to detect and acquire a communication performance parameter of the terminal, and send the parameter to a control module; the control module configured to control a second detection module to detect and acquire a folding angle of the terminal, in response to the received parameter not meeting a preset service requirement; the second detection module configured to send the folding angle to the control module, the control module being further configured to determine a target operating state of an antenna of the terminal, based on the folding angle in combination with a preset correspondence between the folding angle and a desired operating
(Continued)

state of the antenna; and an adjusting module configured to adjust an operating state of the antenna to the target operating state.

14 Claims, 6 Drawing Sheets

(58) Field of Classification Search
CPC ........ H01Q 1/2266; H01Q 1/273; H01Q 3/00; H01Q 21/00; H04M 1/0243; H04M 1/0268; H04M 1/0214; H04M 1/72454
See application file for complete search history.

(56) References Cited

U.S. PATENT DOCUMENTS

| | | | | |
|---|---|---|---|---|
| 2018/0316379 | A1* | 11/2018 | Chang | H01Q 1/245 |
| 2020/0329435 | A1* | 10/2020 | Lee | G06F 1/1698 |
| 2023/0086173 | A1* | 3/2023 | Lee | H04M 1/026<br>455/566 |

FOREIGN PATENT DOCUMENTS

| | | | | | |
|---|---|---|---|---|---|
| CN | 108833683 | A | | 11/2018 | |
| CN | 108924342 | A | * | 11/2018 | H04M 1/72448 |
| CN | 110098486 | A | * | 8/2019 | H04B 7/0413 |
| CN | 110138960 | A | | 8/2019 | |
| CN | 110324480 | A | | 10/2019 | |
| CN | 111831068 | A | | 10/2020 | |
| CN | 212752311 | U | | 3/2021 | |
| JP | 2004297453 | A | | 10/2004 | |
| JP | 2009267800 | A | | 11/2009 | |
| JP | 2010028413 | A | | 2/2010 | |
| JP | 2017034600 | A | | 2/2017 | |
| JP | 2020535748 | A | | 12/2020 | |
| KR | 20210049343 | A | | 5/2021 | |

OTHER PUBLICATIONS

Japan Patent Office, first Office action dated Oct. 22, 2024, for corresponding JP application No. 2023-569759.

European Patent Office, the Extended European Search Report dated Sep. 19, 2024, for corresponding EP application No. 22806590.0.

* cited by examiner

FLEXIBLE SCREEN TERMINAL, ANTENNA ADJUSTING METHOD, AND STORAGE MEDIUM

CROSS-REFERENCE TO RELATED APPLICATION

The present application is a National Phase Application filed under 35 U.S.C. 371 as a national stage of PCT/CN2022/091010 filed on May 5, 2022, and is filed based on Chinese Patent Application No. 202110524383.2 filed with the China Patent Office on May 13, 2021, and claims the priority of this Chinese Patent Application, the contents of which are incorporated herein in their entirety by reference.

TECHNICAL FIELD

The embodiments of the present application relate to the field of communication technology, in particular, to a flexible screen terminal, an antenna adjusting method and a storage medium.

BACKGROUND

With the rapid development of flexible screen technology, mobile phones, wearable devices, and the like, which are each provided with a flexible/foldable screen, are developed by various manufacturers. The flexible screen is not only thinner in volume, but also lower in power consumption compared with a traditional screen, so that using the flexible screen helps improving battery life of a terminal device. Moreover, based on characteristics of being bendable and good pliability of the flexible screen, the durability of the flexible screen is also significantly higher than that of the traditional screen, so that using the flexible screen can reduce probability of an accidental damage to the terminal device. Based on the above, foldable mobile phones provided with the flexible screen have entered the market on a large scale. The foldable mobile phone can be bent or even twisted by 360 degrees, equivalent to that the screen of the traditional mobile phone is doubled, which can effectively improve user's experiences in office, communication and entertainment.

With the development of the fifth generation mobile communication technology (5th generation mobile networks, abbreviated as 5G), a frequency band that the flexible screen is required to support is very wide, and the requirement on communication performance of an antenna is also very high. However, positions of antennas in a flexible screen terminal (i.e., a foldable terminal) are fixed, and configurations of communication performances of the antennas of the flexible screen terminal are configured based on only a fully-expanded state and/or a fully-closed state of the flexible screen terminal. Therefore, during a folding process of the flexible screen terminal, orthogonality characteristics of the antennas of the flexible screen terminal change accordingly, the operating efficiency of the antennas is also low, and the communication performances of the terminal, such as the Over-the-Air Technology (OTA) performance and the service data throughput, are also greatly reduced, so that the service requirement of the user cannot be met.

SUMMARY

An embodiment of the present application provides a flexible screen terminal, including a first detection module, a second detection module, a control module, an adjusting module, and an antenna, the first detection module is configured to detect and acquire a communication performance parameter of the terminal, and send the parameter to the control module; the control module is configured to control the second detection module to detect and acquire a folding angle of the terminal, in response to that the received parameter is determined not meet a preset service requirement; the second detection module is further configured to send the folding angle to the control module; the control module is further configured to determine a target operating state of the antenna, based on the folding angle in combination with a preset correspondence between the folding angle and a desired operating state of the antenna; and the adjusting module is configured to adjust an operating state of the antenna to the target operating state.

An embodiment of the present application provides an antenna adjusting method, including: acquiring a communication performance parameter of a terminal; acquiring a folding angle of the terminal, in response to that the parameter is determined not meet a preset service requirement; determining a target operating state of an antenna of the terminal, based on the folding angle in combination with a preset correspondence between the folding angle and a desired operating state of the antenna; and adjusting an operating state of the antenna to the target operating state.

An embodiment of the present application further provides a computer readable storage medium storing a computer program thereon, the computer program causes a processor to implement the antenna adjusting method described above.

DETAIL DESCRIPTION OF EMBODIMENTS

The embodiments of the present application mainly aim to provide a flexible screen terminal, an antenna adjusting method and a storage medium, and aim to at least ensure that antennas in the flexible screen terminal are in a desired operating state, and the operating efficiency of the antennas are improved, so that the communication performance of the flexible screen terminal is improved, and the service requirement of the user are better met.

To make the objects, technical solutions and advantages of the embodiments of the present application clearer, the embodiments of the present application will be described in detail below with reference to the accompanying drawings. However, it will be understood by one of ordinary skill in the art that in the various embodiments of the present application, numerous technical details are set forth in order to provide a better understanding of the present application. However, the technical solutions claimed in the present application can be implemented without these technical details and various changes and modifications based on the following embodiments. The following embodiments are divided for convenience of description, and should not constitute any limitation to the specific implementation manner of the present application, and the embodiments may be mutually combined and referred to without contradiction.

Figure 1:
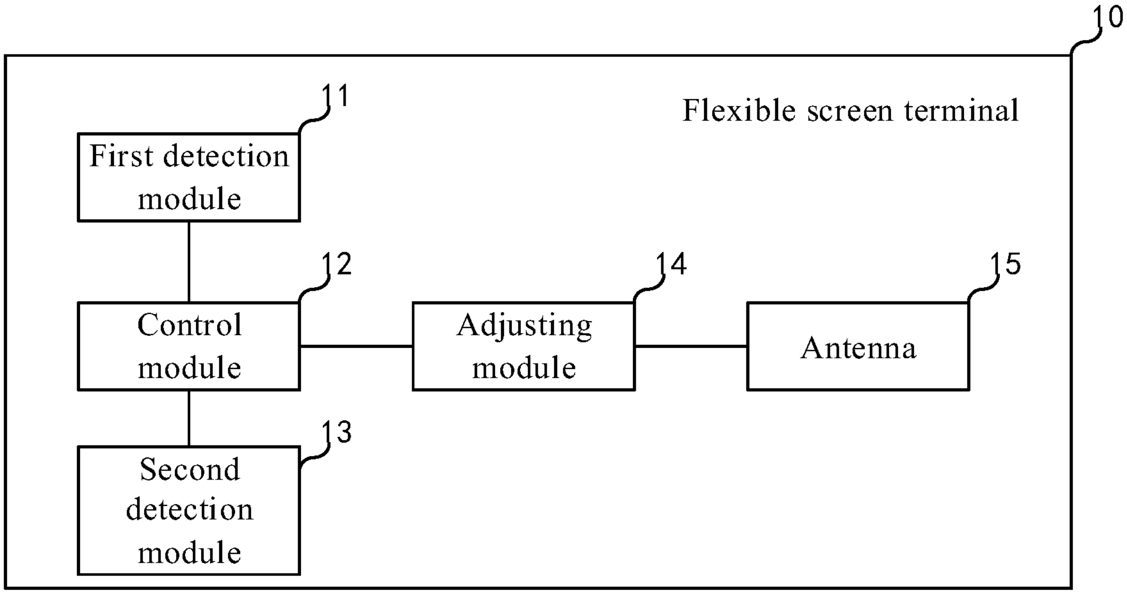
FIG. 1 is a schematic structural diagram of a flexible screen terminal in an embodiment of the present application.

An embodiment of the present application relates to a flexible screen terminal (i.e., a foldable terminal with a flexible/foldable screen), and in specific implementations, the flexible screen terminal of the embodiment of the present application may be a foldable mobile phone, a foldable computer, a rotating shaft mobile phone, and various flexible/foldable wearable devices, each of which is provided with a flexible/foldable screen. The schematic structural diagram of the flexible screen terminal of the embodiment may be as shown in FIG. 1, and the flexible screen terminal 10 of the embodiment may include, but is not limited to, following modules and components, that is, a first detection module 11, a control module 12, a second detection module 13, an adjusting module 14, and an antenna 15. The control module 12 is connected to the first detection module 11, the second detection module 13 and the adjusting module 14, and the adjusting module 14 is connected to the antenna 15.

Figure 2:
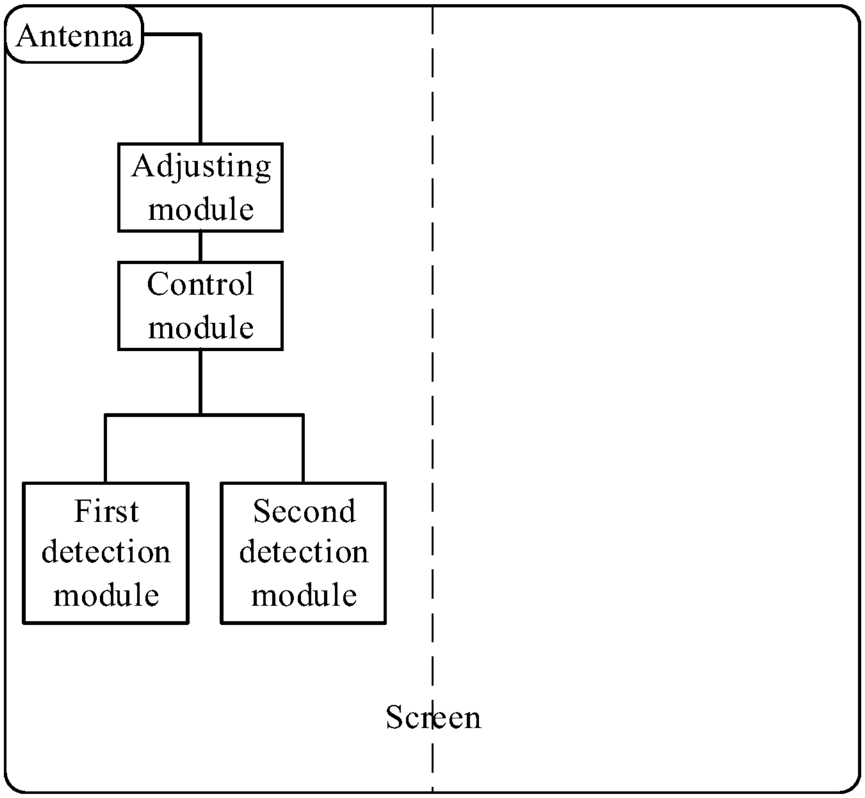
FIG. 2 is a schematic structural diagram of a foldable mobile phone provided by an embodiment of the present application.

In an example, the flexible screen terminal of the embodiment may be a foldable mobile phone with a flexible/foldable screen, the first detection module 11, the control module 12, the second detection module 13, the adjusting module 14, and the antenna 15 may be disposed below the screen of the foldable mobile phone, or may be disposed on a main board of the foldable mobile phone. The control module 12 is connected to the first detection module 11, the second detection module 13 and the adjusting module 14, and the adjusting module 14 is further connected to the antenna 15. The first detection module 11, the control module 12, the second detection module 13, and the adjusting module 14 may be integrated in an antenna adjusting apparatus, or may be separately disposed on the foldable mobile phone. FIG. 2 is a schematic structural diagram of a foldable mobile phone.

The first detection module 11 is configured to detect and acquire a communication performance parameter (i.e., a parameter indicating communication performance) of the terminal, and send the parameter to the control module 12.

Specifically, the first detection module 11 may continuously detect and acquire the communication performance parameter of the terminal, and send the communication performance parameter to the control module 12 after acquiring the communication performance parameter of the terminal.

In specific implementations, the first detection module may be implemented based on a transceiver inside the terminal, including but not limited to a transceiver, a communication radio frequency main chip, and several amplifiers.

In an example, the first detection module 11 may acquire the communication performance parameter of the terminal once every a preset time, and power resources can be effectively saved through such intermittent acquisition manner.

In an example, the first detection module 11 may acquire the communication performance parameter of the terminal once after a folding state of the terminal is changed.

In an example, the communication performance parameter acquired by the first detection module 11 includes an overall communication performance parameter of the terminal, and the overall communication performance parameter of the terminal includes any combination of followings: transmission power, Reference Signal Receiving Power (RSPR), Received Signal Strength Indication (RSSI), Signal Noise Ratio (SNR), multiple-in multiple-out Rank (MIMO Rank), Modulation and Coding Scheme (MCS), modulation order, modulation coefficient, throughput rate, error rate, and the like, of the terminal.

In another example, the communication performance parameter acquired by the first detection module 11 further includes a communication performance parameter of each antenna of the terminal, and the communication performance parameter of each antenna of the terminal includes any combination of followings: transmission power of each antenna, Reference Signal Receiving Power (RSPR) of each antenna, Received Signal Strength Indication (RSSI) of each antenna, and Sounding Reference Signal (SRS) of a path of each antenna.

The control module 12 is configured to control the second detection module 13 to detect and acquire a folding angle of the terminal, in response to that the received parameter is determined not meet a preset service requirement.

In specific implementations, after the control module 12 acquires the communication performance parameter sent by the first detection module 11, the control module 12 may determine whether the communication performance of the terminal meets the preset service requirement according to the communication performance parameter. If the communication performance of the terminal does not meet the preset service requirement, the control module 12 sends a folding angle detection instruction to the second detection module 13, to control the second detection module 13 to detect and acquire the folding angle of the terminal. Therefore, the terminal can quickly respond in response to that the communication performance is deteriorated, and the service is protected from being interrupted. The preset service requirement may be set by one of ordinary skill in the art as desired, and is not specifically limited by the embodiment of the present application.

In an example, if the communication performance of the terminal meets the current service requirement, the flexible screen terminal does not adjust the antenna, and still keeps the first detection module 11 operating normally, and continuously or periodically detects and acquires the communication performance parameter of the terminal.

The second detection module 13 is configured to detect and acquire a folding angle of the terminal, and send the folding angle of the terminal to the control module 12.

Specifically, the control module 12 may send a folding angle detection instruction to the second detection module 13, in response to that the communication performance of the terminal is determined not meet the preset service requirement, and the second detection module 13 may detect and acquire the folding angle of the terminal after receiving the instruction, and send the folding angle to the control module 12.

In specific implementations, the second detection module 13 may further detect and acquire a folding state of the terminal, and the folding state of the terminal may include a folded state, a fully-closed state, and a fully-expanded state.

In an example, the second detection module 13 may include an infrared sensor, and the second detection module 13, after receiving the instruction, uses the infrared sensor to emit infrared rays to detect and acquire the folding angle of the flexible screen terminal.

In an example, the second detection module 13 may acquire information of a display page of a baseband, and detect and acquire the folding angle of the flexible screen terminal according to the information of the display page of the baseband.

Figure 3:
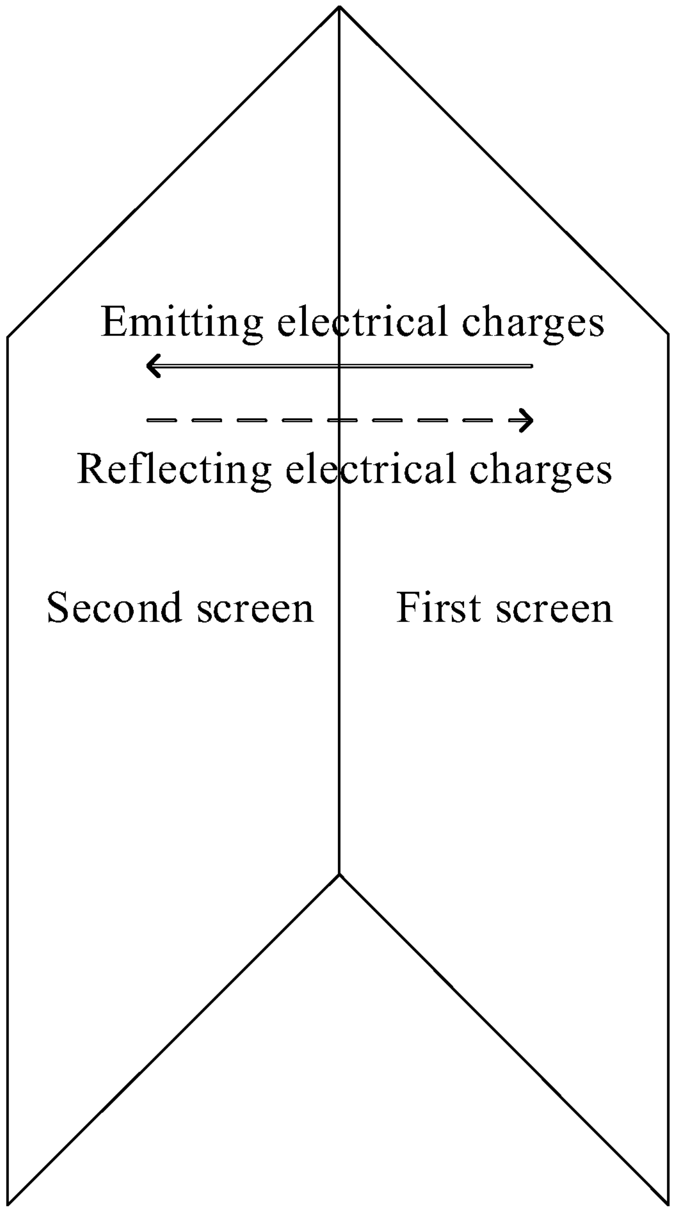
FIG. 3 is a schematic diagram of detecting and acquiring a folding angle of a terminal by a second detection module provided by an embodiment of the present application.

In another example, a schematic diagram of detecting and acquiring the folding angle of the terminal by the second detection module 13 may be as shown in FIG. 3. The flexible screen terminal may include a first screen and a second screen, the first screen and the second screen may be two regions of a complete flexible/foldable screen, and the first screen and the second screen are distinguished for convenience of description. The second detection module 13 may emit electrical charges to outside through the first screen of the terminal, in response to that the emitted electrical charges meet the second screen, a part of electrical charges may be reflected back, the second detection module 13 may determine the number of the electrical charges reflected from the second screen to the first screen, and the folding angle of the terminal may be acquired based on the number of the electrical charges, reflected from the second screen to the first screen, in combination with a preset correspondence between the number of the electrical charges and the folding angle. The preset correspondence between the number of the electrical charges and the folding angle may be set by one of ordinary skill in the art, based on a large number of experiments. By emitting and reflecting electrical charges, the folding angle of the terminal can be accurately detected and acquired, without additional sensors.

Specifically, the flexible screen terminal of the embodiment further includes a Specific Absorption Rate (SAR) reduction chip (abbreviated as SAR reduction chip), the second detection module 13 is connected to the SAR reduction chip, and the SAR reduction chip is further connected to each antenna of the first screen and each antenna of the second screen. During the second detection module 13 detecting and acquiring the folding angle of the terminal, a electrical charge rod circuit of the SAR reduction chip may be used to continuously emit electrical charges to outside through each antenna of the first screen. In response to that the emitted electrical charges meet the antenna of the second screen, a part of electrical charges may be reflected back, the second detection module 13 acquires the electrical charges, reflected back by each antenna of the second screen, through a sensor circuit of the SAR reduction chip, and stores the electrical charges in a register, the number of the electrical charges reflected from each antenna of the second screen to each antenna of the first screen is determined by performing an analog-to-digital conversion on the stored electrical charges, and the second detection module 13 acquires the folding angle of the terminal, based on the number of the electrical charges, reflected to each antenna of the first screen, in combination with the preset correspondence between the number of the electrical charges and the folding angle. Multiple antennas emit electrical charges simultaneously for a multi-channel simultaneous multiplexing detection, so that the precision of the acquired folding angle can be further improved.

In an example, the SAR reduction chip may be connected to other metal coupling units of the screen of the terminal, and the second detection module 13 continuously emits the electrical charges to outside via these metal coupling units, through the electrical charge rod circuit of the SAR reduction chip.

In an example, the number of the electrical charges reflected back may be represented by a SAR value, which is inversely proportional to a distance and the folding angle, and is directly proportional to an inductive projection area. The preset correspondence between the number of the electrical charges and the folding angle may be as shown in Table 1.

TABLE 1 preset correspondence between number of the electrical charges and folding angle

| Folding angle (Unit: °) | Number of the electrical charges (SAR value) (unit: W/kg) |
|---|---|
| 0° | 1.8 W/kg |
| 30° | 1.6 W/kg |
| 60° | 1.4 W/kg |
| 90° | 1.2 W/kg |
| 120° | 1.0 W/kg |
| 150° | 0.8 W/kg |
| 180° | 0.6 W/kg |

For example, the second detection module 13 determines that the number of the electrical charges reflected from the second screen to the first screen is 1.0 W/kg, and then the second detection module 13 determines that the folding angle of the terminal is 120° based on the number of the electrical charges reflected from the second screen to the first screen in combination with the preset correspondence between the number of the electrical charges and the folding angle.

The control module 12 is further configured to determine a target operating state of the antenna, based on the folding angle in combination with a preset correspondence between the folding angle and a desired operating state of the antenna of the terminal.

Specifically, after receiving the folding angle of the terminal sent by the second detection module 13, the control module 12 may determine a target operating state of the antenna, based on the folding angle in combination with the preset correspondence between the folding angle and the desired operating state of the antenna of the terminal. Considering that positions of antennas in the flexible screen terminal are fixed, and configurations of communication performances of the antennas of the flexible screen terminal are based on only the fully-expanded state or the fully-closed state of the flexible screen terminal, during a folding process of the flexible screen terminal, orthogonality characteristics of the antennas of the flexible screen terminal are deteriorated accordingly, and the operating efficiency of the antennas is reduced, by determining the target operating state of the antenna, i.e., the desired operating state of the antenna at the folding angle, according to the folding angle, the operating efficiency of the antennas of the flexible screen terminal can be improved, the communication performance of the flexible screen terminal can be improved, and the service requirement of the user can be better met.

In specific implementations, the flexible screen terminal further includes a memory, and the preset correspondence between the folding angle and the desired operating state of the antenna of the terminal is obtained based on a large number of simulation experiments, and may be pre-stored in the memory of the flexible screen terminal in a form of an algorithm. After receiving the folding angle of the terminal, the control module 12 may call the pre-stored algorithm, to determine the target operating state of the antenna.

The adjusting module 14 is configured to adjust the operating state of the antenna 15 to the target operating state.

In specific implementations, the adjusting module 14 is connected to N antennas of the terminal, N is an integer greater than 0. The operating state of the antennas may include the number of operating antennas and/or a combination of operating antennas. The control module 12 is configured to determine M target antennas among the N antennas, based on the folding angle in combination with a preset correspondence between the folding angle and the target antenna, M is an integer greater than 0 and less than N. The adjusting module 14 is configured to turn on the M target antennas and turn off the antennas other than the M target antennas. Considering that the layout of antennas in the related 5G flexible screen terminal is fixed and single, and the related/traditional antenna combination (i.e., combination of antennas) is configured based on the fully-expanded state and/or the fully-closed state of the flexible screen terminal, if the folding angle of the terminal is an arbitrary angle, the isolation and the orthogonality characteristics of the traditional antenna combination cannot meet the service requirement, by contrast, the flexible screen terminal of the embodiment calls different antenna combinations (i.e., combinations of antennas) at different folding angles, so that it is ensured that the isolation between the antennas in the antenna combination is desired, the orthogonality characteristics of the antennas are the best, a total gain of the antennas is stronger, the operating efficiency of the antennas of the flexible screen terminal is further improved, and the communication performance of the flexible screen terminal is further improved.

In an example, the adjusting module 14 may be implemented based on a switch array of the antennas.

In an example, the preset correspondence between the folding angle and the target antenna is obtained based on a large number of simulation experiments, and may be pre-stored in the memory of the flexible screen terminal in the form of an algorithm. After receiving the folding angle of the terminal, the control module 12 may call the pre-stored algorithm, to determine M target antennas among the N antennas.

Figure 4:
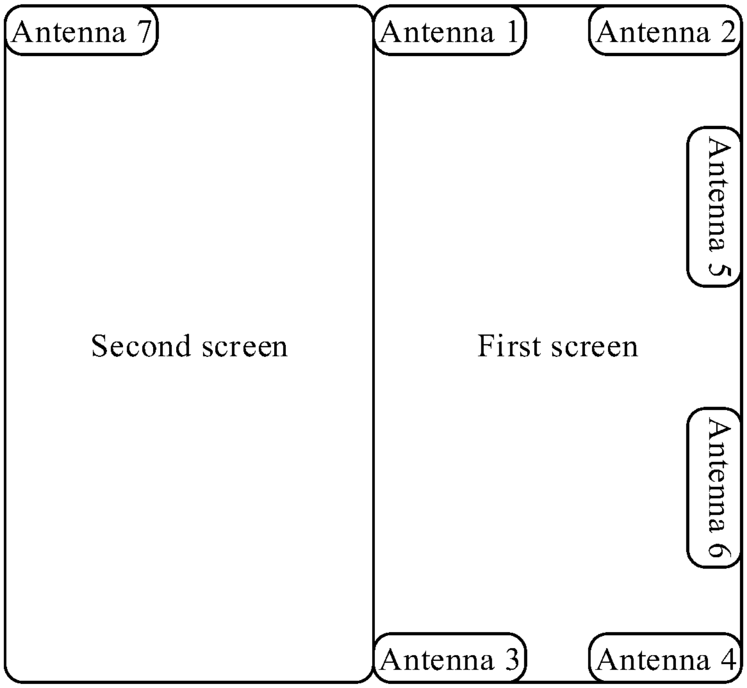
FIG. 4 is a schematic layout diagram of antennas in a flexible screen terminal provided by an embodiment of the present application.

For example, the terminal is provided with seven antennas, layout positions of the seven antennas may be as shown in FIG. 4. Antenna 1, antenna 2, antenna 3, and antenna 4 are conventional 4 by 4 MIMO antennas, antenna 5 and antenna 6 are newly added auxiliary antennas capable of operating in a 5G frequency band, and antenna 7 is an LTE antenna capable of operating in the 5G frequency band after being modified. The preset correspondence between the folding angle and the target antenna may be as shown in Table 2.

TABLE 2 preset correspondence between folding angle and target antenna

| Folding angle | Antenna 1 | Antenna 2 | Antenna 3 | Antenna 4 | Antenna 5 | Antenna 6 | Antenna 7 |
|---|---|---|---|---|---|---|---|
| 0° | On | On | On | On | Off | Off | Off |
| 30° | Off | On | On | On | On | Off | Off |
| 60° | Off | Off | On | On | On | On | Off |
| 90° | Off | Off | Off | On | On | On | On |
| 120° | On | Off | On | On | On | Off | Off |
| 150° | On | On | Off | On | On | Off | Off |
| 180° | On | On | On | Off | On | Off | Off |

In response to that the second detection module 13 acquires that the folding angle of the terminal is 150°, the control module 12 determines, based on the folding angle of the terminal in combination with the preset correspondence between the folding angle and the target antenna, that the target antennas are antenna 1, antenna 2, antenna 4 and antenna 5. The adjusting module 14 turns on antenna 1, antenna 2, antenna 4 and antenna 5, and turns off antenna 3, antenna 6 and antenna 7.

In an example, after the adjusting module 14 adjusts the operating state of the antennas to the target operating state, the first detection module 11 may continue to detect and acquire the communication performance parameter of the terminal, and send the parameter to the control module 12; the control module 12 continuously determines whether the communication performance of the terminal meets the current service requirement, and if the communication performance of the terminal does not meet the current service requirement, the control module 12 continues to adjust the operating state of the antennas, until the communication performance of the terminal meets the current service requirement.

The flexible screen terminal of the embodiment includes a first detection module, a second detection module, a control module, an adjusting module and an antenna. The first detection module is configured to detect and acquire a communication performance parameter of the terminal, and send the parameter to the control module. The control module is configured to control the second detection module to detect and acquire a folding angle of the terminal, in response to that the received parameter is determined not meet the preset service requirement, so that the communication performance of the terminal is monitored in real time, a response can be rapidly made in response to that the communication performance of the terminal is deteriorated, and the service is protected from being interrupted. The second detection module is further configured to send the folding angle to the control module. The control module is further configured to determine a target operating state of the antenna, based on the folding angle in combination with a preset correspondence between the folding angle and the desired operating state of the antenna. The adjusting module is configured to adjust the operating state of the antenna to a target operating state. If the communication performance of the terminal does not meet the preset service requirement, the flexible screen terminal can determine the current folding angle, and adjust the operating state of the antenna to an operating state corresponding to the folding angle, i.e., the desired operating state, so that the operating efficiency of the antenna of the flexible screen terminal can be improved, the OTA performance of the flexible screen terminal can be improved, the service data throughput of the terminal can be increased, and the service requirement of the user can be better met.

In addition, in order to highlight the innovative part of the present application, a module, not so closely related to solving the technical problem proposed by the present application, is not introduced in the embodiment, which does not indicate that no other module exists in the embodiment.

Figure 5:
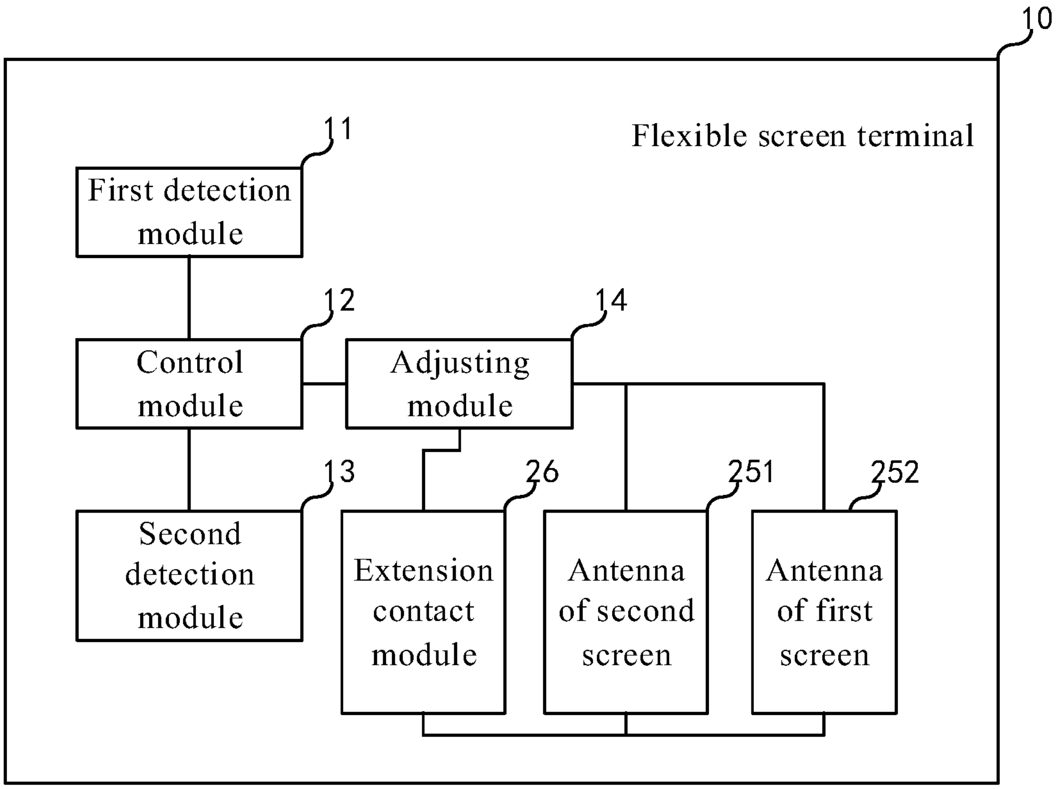
FIG. 5 is a schematic structural diagram of a flexible screen terminal in another embodiment of the present application.
Figure 6:
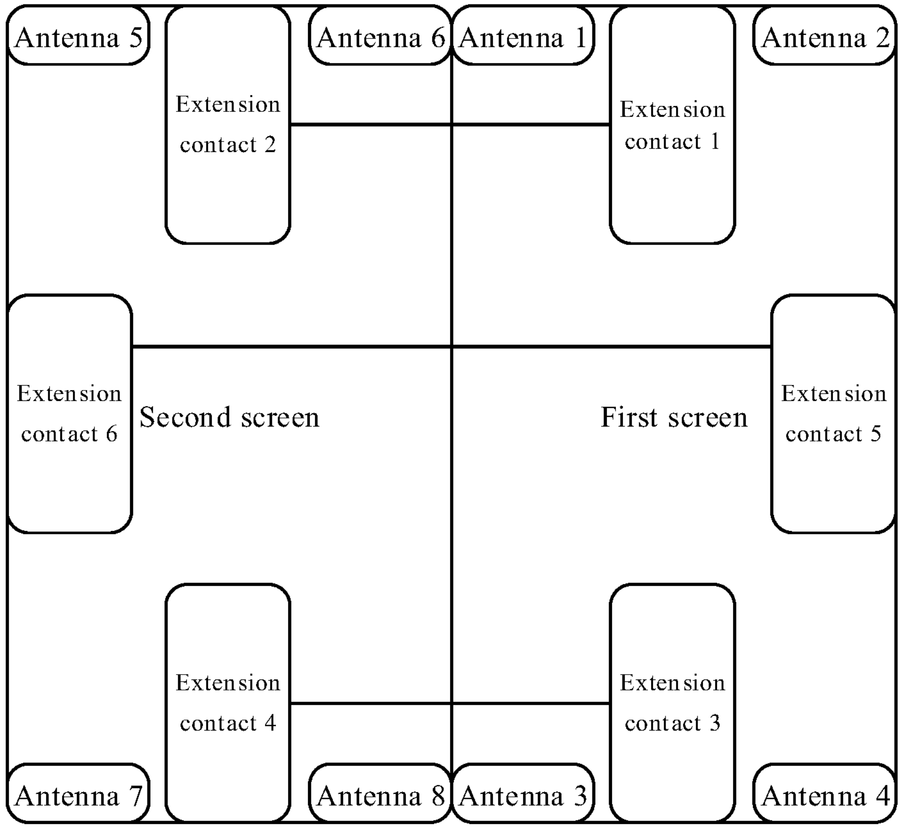
FIG. 6 is a schematic layout diagram of extension contacts provided by another embodiment of the present application.

Another embodiment of the present application relates to a flexible screen terminal, and a schematic structural diagram of the flexible screen terminal of the embodiment may be as shown in FIG. 5.

The flexible screen terminal 10 of the embodiment includes a first detection module 11, a control module 12, a second detection module 13, an adjusting module 14, an antenna 251 of a first screen, an antenna 252 of a second screen, and an extension contact module 26. The control module 12 is connected to the first detection module 11, the second detection module 13, and the adjusting module 14. The adjusting module 14 is further connected to the antenna 251 of the first screen, the antenna 252 of the second screen, and the extension contact module 26. The extension contact module 26 is further connected to the antenna 251 of the first screen and the antenna 252 of the second screen. The extension contact module 26 includes P extension contacts configured to connect the antenna 251 of the first screen with the antenna 252 of the second screen, P is an integer greater than 0.

The control module 12 is further configured to determine Q target extension contacts among the P extension contacts, based on the folding angle in combination with a preset correspondence between the folding angle and the target extension contacts, Q is an integer greater than 0 and less than P.

The adjusting module 14 is further configured to turn on the Q target extension contacts, to connect the antenna 251 of the first screen with the antenna 252 of the second screen.

In specific implementations, the P extension contacts of the extension contact module 26 each are connected to the antenna 251 of the first screen and the antenna 252 of the second screen, respectively. After receiving the folding angle of the terminal sent by the second detection module 13, the control module 12 may determine the Q target extension contacts among the P extension contacts, based on the folding angle in combination with the preset correspondence between the folding angle and the target extension contacts, and the adjusting module 14 turns on the Q target extension contacts to connect the antenna of the first screen with the antenna of the second screen. A metal mechanism, such as a metal hinge, an absorption magnet, or a metal sheet decoration, may be arranged between the first screen and the second screen, considering that the flexible screen terminal is to be folded, and since the two screens are relatively independent, a clearance area of the antenna is not a complete continuous radiator, the clearance area of the antenna is relatively small, and an effective length of the antenna is relatively short. However, the flexible screen terminal of the embodiment includes the P extension contacts, and the Q extension contacts can be turned on according to the folding angle to connect the antenna 251 of the first screen with the antenna 252 of the second screen, so that the clearance area of the antenna of the terminal is formed into a complete continuous radiator, the effective length of the antenna is increased, and the clearance area of the antenna of the terminal is enlarged.

In an example, the adjusting module 14 may be implemented, based on controlling monopole double throw switches of the extension contacts in the extension contact module.

In an example, the preset correspondence between the folding angle and the target extension contacts is obtained based on a large number of simulation experiments, and may be pre-stored in the memory of the flexible screen terminal in the form of an algorithm. After receiving the folding angle of the terminal, the control module 12 may call the pre-stored algorithm to determine the Q target extension contacts among the P extension contacts.

In an example, the extension contact module 26 includes six extension contacts, that is, extension contact 1, extension contact 2, extension contact 3, extension contact 4, extension contact 5 and extension contact 6. The layout positions of the six extension contacts may be as shown in FIG. 7, the control module 12 determines that extension contact 3 and extension contact 4 are target extension contacts, and the adjusting module 14 turns on extension contact 3 and extension contact 4 to connect the antenna of the first screen with the antenna of the second screen.

Figure 7:
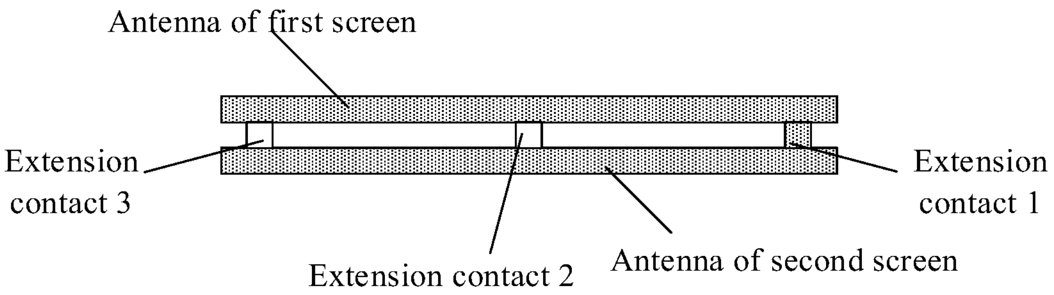
FIG. 7 is a schematic diagram of antennas connected through extension contacts provided by another embodiment of the present application.

In an example, the schematic diagram of the antennas connected through the extension contacts may be shown in FIG. 7, the antenna 251 of the first screen is connected to the antenna 252 of the second screen, and the clearance area of the antennas is formed into a complete continuous radiator.

In the embodiment, the terminal includes a first screen and a second screen, and the terminal further includes an extension contact module, the extension contact module includes P extension contacts configured to connect an antenna of the first screen with an antenna of the second screen, P is an integer greater than 0. The control module is further configured to determine Q target extension contacts among the P extension contacts, based on the folding angle in combination with a preset correspondence between the folding angle and the target extension contacts, Q is an integer greater than 0 and less than P. The adjusting module is further configured to turn on the Q target extension contacts, to connect the antenna of the first screen with the antenna of the second screen. Since the two screens of the flexible screen terminal are relatively independent, the clearance area of the antennas is not a complete continuous radiator, the clearance area of the antennas is relatively small, and the effective length of the antennas is relatively short, the flexible screen terminal of the embodiment further includes the P extension contacts, the Q target extension contacts may be turned on according to the folding angle, so that the antenna of the first screen is connected to the antenna of the second screen, the clearance area of the antennas of the terminal becomes a complete continuous radiator, the effective length of the antennas is increased, and the clearance area of the antennas of the terminal is enlarged.

In addition, in order to highlight the innovative part of the present application, a module, not so closely related to solving the technical problem proposed by the present application, is not introduced in the embodiment, which does not indicate that no other module exists in the embodiment.

Figure 8:
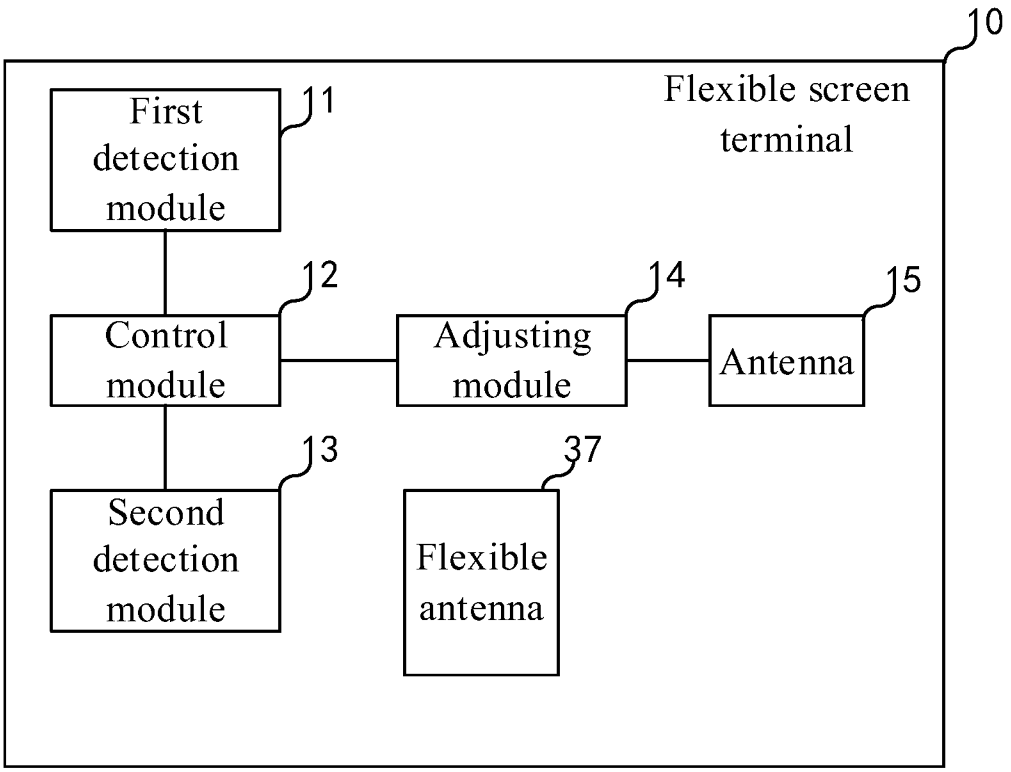
FIG. 8 is a schematic structural diagram of a flexible screen terminal in another embodiment of the present application.

Another embodiment of the present application relates to a flexible screen terminal, and a schematic structural diagram of the flexible screen terminal of the embodiment may be as shown in FIG. 8.

The flexible screen terminal 10 of the embodiment includes a first detection module 11, a control module 12, a second detection module 13, an adjusting module 14, an antenna 15, and a stretchable flexible antenna 37. The control module 12 is connected to the first detection module 11, the second detection module 13 and the adjusting module 14, and the adjusting module 14 is further connected to the antenna 15.

Figure 9:
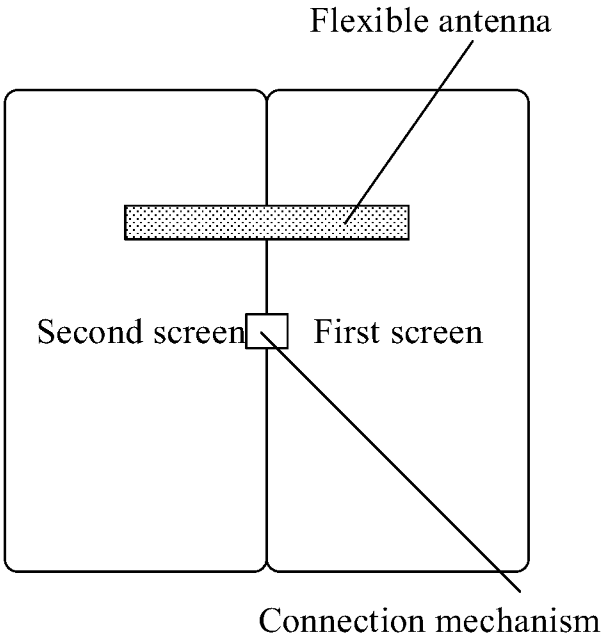
FIG. 9 is a schematic layout diagram of a flexible antenna provided by another embodiment of the present application.
Figure 10:
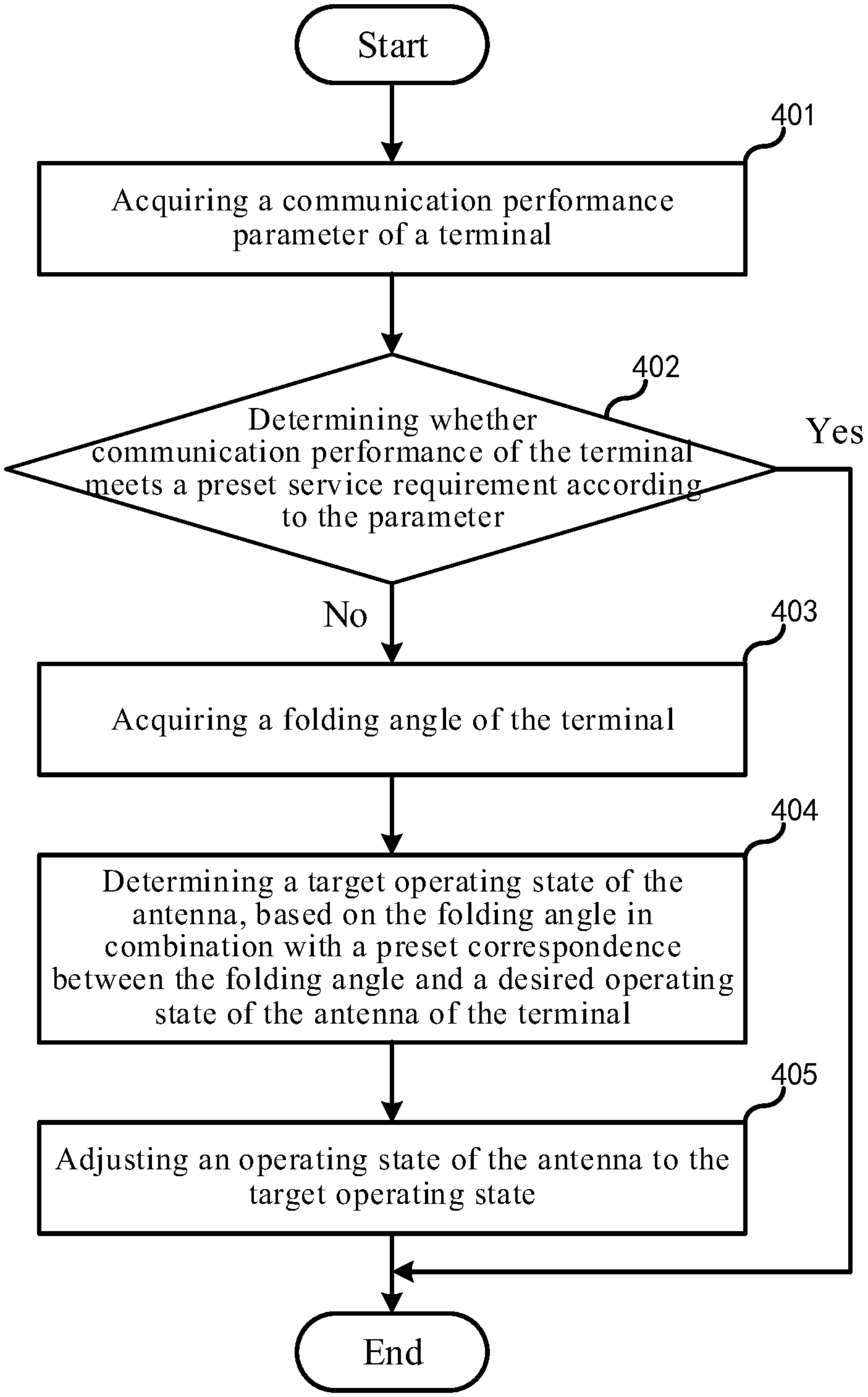
FIG. 10 is a flow chart of an antenna adjusting method in another embodiment of the present application.

The schematic layout position of the flexible antenna 37 in the embodiment may be as shown in FIG. 9, the flexible antenna 37 is connected to a first screen of the terminal and a second screen of the terminal, and the first screen and the second screen are rotatably connected together, through a connection mechanism.

The control module 12 is configured to determine a desired resonant frequency point of the flexible antenna 37, and determine, in combination with a preset correspondence between the desired resonant frequency point and the folding angle, a corresponding target folding angle at which the flexible antenna 37 operates at the desired resonant frequency point. The adjusting module 14 is further configured to drive the connection mechanism between the first screen and the second screen, to rotate the terminal to a target folding angle.

Specifically, the control module 12 may determine the desired resonant frequency point of the flexible antenna 37 according to the current operating frequency band of the terminal, and determine, in combination with the preset correspondence between the desired resonant frequency point and the folding angle, the corresponding target folding angle at which the flexible antenna 37 operates at the desired resonant frequency point. The adjusting module 14 may drive the connection mechanism between the first screen and the second screen according to the target folding angle, to rotate the terminal to the target folding angle, so that an electrical length of the flexible antenna 37 is increased, the flexible antenna 37 operates at the desired resonant frequency point, and the communication performance of the flexible screen terminal is further improved.

In an example, the adjusting module 14 may be implemented based on an antenna tuning and matching chip.

In an example, the connection mechanism may be a drivable motor.

In an example, the preset correspondence between the desired resonant frequency point and the folding angle is obtained based on a large number of simulation experiments, which may be pre-stored in the memory of the flexible screen terminal in the form of an algorithm. After receiving the folding angle of the terminal, the control module 12 may call the pre-stored algorithm, to determine the corresponding target folding angle at which the flexible antenna 37 operates at the desired resonant frequency point.

In an example, the adjusting module 14 may further display the target folding angle on the first screen and/or the second screen of the terminal, instructing the corresponding user of the terminal to rotate the terminal to the target folding angle. The embodiment allows the user to manually adjust the folding angle of the terminal, so that the interactivity between the user and the terminal can be improved.

In the embodiment, the terminal includes a first screen and a second screen, the first screen and the second screen are rotatably connected together, through a connection mechanism. The terminal further includes a stretchable flexible antenna, and the flexible antenna is connected to the first screen and the second screen. The control module 12 is further configured to determine a desired resonant frequency point of the flexible antenna, and determine, in combination with a preset correspondence between the desired resonant frequency point and the folding angle, a corresponding target folding angle at which the flexible antenna operates at the desired resonant frequency point. The adjusting module is further configured to drive the connection mechanism, to rotate the terminal to the target folding angle, so that the electrical length of the flexible antenna is increased, the flexible antenna operates at the desired resonant frequency point, and the communication performance of the terminal is further improved.

In addition, in order to highlight the innovative part of the present application, a module, not so closely related to solving the technical problem proposed by the present application, is not introduced in the embodiment, which does not indicate that no other module exists in the embodiment.

Another embodiment of the present application relates to an antenna adjusting method, and details of implementation of the antenna adjusting method of the embodiment are specifically described below. The following are only provided for facilitating understanding of the details of implementation, and are not necessary to implement the embodiment. A flowchart of the antenna adjusting method of the embodiment may be as shown in FIG. 11, and the antenna adjusting method specifically includes steps 401 to 405.

Step 401, acquiring a communication performance parameter of a terminal.

Step 402, determining whether communication performance of the terminal meets a preset service requirement according to the parameter, if the communication performance of the terminal meets the preset service requirement, ending the process, if the communication performance of the terminal does not meet the preset service requirement, executing step 403.

Step 403, acquiring a folding angle of the terminal.

Step 404, determining a target operating state of an antenna of the terminal, based on the folding angle in combination with a preset correspondence between the folding angle and a desired operating state of the antenna of the terminal.

Step 405, adjusting an operating state of the antenna to the target operating state.

It is easy to find that this embodiment is an embodiment of a usage method corresponding to the above embodiments, and this embodiment may be implemented in cooperation with the above embodiments. The related technical details and technical effects mentioned in the above embodiments are still valid in this embodiment, and are not described herein again in order to reduce repetition. Accordingly, the related technical details mentioned in this embodiment may also be applied to the above embodiments.

Another embodiment of the present application relates to a computer-readable storage medium storing a computer program thereon, the computer program causes a processor to implement the method in the above embodiment.

That is, as can be understood by one of ordinary skill in the art, all or part of the steps in the method of the embodiment described above may be implemented by instructing related hard-wares by a program, the program is stored in a storage medium and includes several instructions to enable a device (which may be a single chip, a chip, or the like) or a processor to execute all or part of the steps of the method in the embodiment of the present application. The aforementioned storage medium includes various medium capable of storing program codes, such as a USB disk, a removable hard disk, a Read-Only Memory (ROM), a Random Access Memory (RAM), a magnetic disk, or an optical disk.

It will be understood by one of ordinary skill in the art that the foregoing embodiments are specific examples of implementations of the present application, and various changes in form and details may be made in practical applications, without departing from the spirit and scope of the present application.

What is claimed is:

1. A flexible screen terminal, comprising a first detection module, a second detection module, a control module, an adjusting module, and an antenna, wherein the first detection module is configured to detect and acquire a communication performance parameter of the terminal, and send the parameter to the control module;

the control module is configured to control the second detection module to detect and acquire a folding angle of the terminal, in response to that the received parameter is determined not meet a preset service requirement;

the second detection module is further configured to send the folding angle to the control module;

the control module is further configured to determine a target operating state of the antenna, based on the folding angle in combination with a preset correspondence between the folding angle and a desired operating state of the antenna; and the adjusting module is configured to adjust an operating state of the antenna to the target operating state, wherein the terminal further comprises a first screen and a second screen, the first screen and the second screen are rotatably connected together through a connection mechanism;

the terminal further comprises a stretchable flexible antenna, and the flexible antenna is connected to the first screen and the second screen;

the control module is further configured to determine a desired resonant frequency point of the flexible antenna, and determine, in combination with a preset correspondence between the desired resonant frequency point and the folding angle, a corresponding target folding angle at which the flexible antenna operates at the desired resonant frequency point; and the adjusting module is further configured to drive the connection mechanism, to rotate the terminal to the target folding angle.

2. The flexible screen terminal of claim 1, wherein the terminal comprises N antennas, wherein N is an integer greater than 0;

the control module is further configured to determine M target antennas among the N antennas, based on the folding angle in combination with a preset correspondence between the folding angle and the target antennas, wherein M is an integer greater than 0 and less than N; and the adjusting module is further configured to turn on the M target antennas and turn off the antennas other than the M target antennas.

3. The flexible screen terminal of claim 2, further comprising a first screen, a second screen, and an extension contact module, wherein the extension contact module comprises P extension contacts configured to connect an antenna of the first screen with an antenna of the second screen, wherein P is an integer greater than 0;

the control module is further configured to determine Q target extension contacts among the P extension contacts, based on the folding angle in combination with a preset correspondence between the folding angle and the target extension contacts, wherein Q is an integer greater than 0 and less than P; and the adjusting module is further configured to turn on the Q target extension contacts, to connect the antenna of the first screen with the antenna of the second screen.

4. The flexible screen terminal of claim 2, wherein the second detection module is configured to emit electrical charges to outside through the first screen, and determine a total number of the electrical charges reflected from the second screen to the first screen; and the second detection module is further configured to acquire the folding angle of the terminal, based on the number of the electrical charges in combination with a preset correspondence between the number of the electrical charges and the folding angle.

5. The flexible screen terminal of claim 1, further comprising an extension contact module, wherein the extension contact module comprises P extension contacts configured to connect an antenna of the first screen with an antenna of the second screen, wherein P is an integer greater than 0;

the control module is further configured to determine Q target extension contacts among the P extension contacts, based on the folding angle in combination with a preset correspondence between the folding angle and the target extension contacts, wherein Q is an integer greater than 0 and less than P; and the adjusting module is further configured to turn on the Q target extension contacts, to connect the antenna of the first screen with the antenna of the second screen.

6. The flexible screen terminal of claim 5, wherein the second detection module is configured to emit electrical charges to outside through the first screen, and determine a total number of the electrical charges reflected from the second screen to the first screen; and the second detection module is further configured to acquire the folding angle of the terminal, based on the number of the electrical charges in combination with a preset correspondence between the number of the electrical charges and the folding angle.

7. The flexible screen terminal of claim 1, wherein the adjusting module is further configured to display the target folding angle on at least one of the first screen or the second screen, instructing a corresponding user of the terminal to rotate the terminal to the target folding angle.

8. The flexible screen terminal of claim 7, wherein the second detection module is configured to emit electrical charges to outside through the first screen, and determine a total number of the electrical charges reflected from the second screen to the first screen; and the second detection module is further configured to acquire the folding angle of the terminal, based on the number of the electrical charges in combination with a preset correspondence between the number of the electrical charges and the folding angle.

9. The flexible screen terminal of claim 1, wherein the second detection module is configured to emit electrical charges to outside through the first screen, and determine a total number of the electrical charges reflected from the second screen to the first screen; and the second detection module is further configured to acquire the folding angle of the terminal, based on the number of the electrical charges in combination with a preset correspondence between the number of the electrical charges and the folding angle.

10. The flexible screen terminal of claim 9, further comprising a specific absorption rate reduction chip (SAR reduction chip), wherein the second detection module is further configured to emit electrical charges to outside via each antenna of the first screen, through the SAR reduction chip, and determine a total number of the electrical charges reflected from each antenna of the second screen to the antenna of the first screen; and the second detection module is further configured to acquire the folding angle of the terminal, based on the number of the electrical charges, reflected to each antenna of the first screen, in combination with a preset correspondence between the number of the electrical charges and the folding angle.

11. The flexible screen terminal of claim 1, wherein the communication performance parameter comprises an overall communication performance parameter of the terminal; and the overall communication performance parameter of the terminal comprises any combination of transmission power, Reference Signal Receiving Power (RSPR), Received Signal Strength Indication (RSSI), Signal Noise Ratio (SNR), multiple-in multiple-out Rank (MIMO Rank), Modulation and Coding Scheme, modulation order, modulation coefficient, throughput rate, and error rate, of the terminal.

12. The flexible screen terminal of claim 1, wherein the communication performance parameter further comprise a communication performance parameter of each antenna of the terminal; and the communication performance parameter of each antenna of the terminal comprises any combination of transmission power of each antenna, Reference Signal Receiving Power (RSPR) of each antenna, Received Signal Strength Indication (RSSI) of each antenna, and Sounding Reference Signal (SRS) of a path of each antenna.

13. A foldable terminal, comprising a first detection module, a second detection module, a control module, an adjusting module, and an antenna;

wherein the first detection module is configured to detect and acquire a communication performance parameter of the terminal, and send the parameter to the control module;

the control module is configured to control the second detection module to detect and acquire a folding angle of the terminal, in response to that the received parameter is determined not meet a preset service requirement;

the second detection module is further configured to send the folding angle to the control module;

the control module is further configured to determine a target operating state of the antenna, based on the folding angle in combination with a preset correspondence between the folding angle and a desired operating state of the antenna; and the adjusting module is configured to adjust an operating state of the antenna to the target operating state, wherein the terminal further comprises a first screen and a second screen, the first screen and the second screen are rotatably connected together through a connection mechanism;

the terminal further comprises a stretchable flexible antenna, and the flexible antenna is connected to the first screen and the second screen;

the control module is further configured to determine a desired resonant frequency point of the flexible antenna, and determine, in combination with a preset correspondence between the desired resonant frequency point and the folding angle, a corresponding target folding angle at which the flexible antenna operates at the desired resonant frequency point; and the adjusting module is further configured to drive the connection mechanism, to rotate the terminal to the target folding angle.

14. A flexible screen terminal, comprising a first detection module, a second detection module, a control module, an adjusting module, and an antenna, wherein the first detection module is configured to detect and acquire a communication performance parameter of the terminal, and send the parameter to the control module;

the control module is configured to control the second detection module to detect and acquire a folding angle of the terminal, in response to that the received parameter is determined not meet a preset service requirement;

the second detection module is further configured to send the folding angle to the control module;

the control module is further configured to determine a target operating state of the antenna, based on the folding angle in combination with a preset correspondence between the folding angle and a desired operating state of the antenna; and the adjusting module is configured to adjust an operating state of the antenna to the target operating state, wherein the second detection module is configured to emit electrical charges to outside through the first screen, and determine a total number of the electrical charges reflected from the second screen to the first screen; and the second detection module is further configured to acquire the folding angle of the terminal, based on the number of the electrical charges in combination with a preset correspondence between the number of the electrical charges and the folding angle.

* * * * *